United States Patent [19]

Hsu

[11] Patent Number: 4,617,500
[45] Date of Patent: Oct. 14, 1986

[54] WIRING CONSTRUCTION OF A CONTROL SWITCH CONTROLLING A CEILING FAN

[76] Inventor: Dick Y. Hsu, 60 Liao Chung E. 12th St, Pei Tun District, Taichung, Taiwan

[21] Appl. No.: 757,254

[22] Filed: Jul. 22, 1985

[51] Int. Cl.$^4$ .......................... H02P 7/40; H05K 1/18
[52] U.S. Cl. .................................... 318/305; 361/397; 361/399; 361/400
[58] Field of Search ............... 361/397, 399, 400, 401, 361/404, 409, 405, 406, 384; 318/305

[56] References Cited

U.S. PATENT DOCUMENTS

| | | | |
|---|---|---|---|
| 3,492,537 | 1/1970 | Inman | 361/409 |
| 3,522,485 | 8/1970 | Metrick | 361/399 |
| 4,494,055 | 1/1985 | Bitting et al. | 318/254 |

Primary Examiner—William M. Shoop, Jr.
Assistant Examiner—Bentsu Ro
Attorney, Agent, or Firm—Cushman, Darby & Cushman

[57] ABSTRACT

The present invention discloses an improved wiring construction of a control switch controlling a ceiling fan, the control switch being manually operated by a cord hanging from the control switch, the wiring construction comprising connecting means having two power source contacts and three connective contacts arranged systematically on a printed circuit board with its three connective contacts connected to a first end and a second end of a first winding of the drive motor driving the ceiling fan and to a tapping of the winding respectively; a condenser connected to one of the power source contacts, and to the first end of the first winding respectively through the connecting means; and a speed selecting switch actuated by the cord, and connected to the second end of the first winding, to the tapping, and to the other power source contact respectively through the connecting means for selecting different turns of the first winding to couple to the power source, so that the ceiling fan can rotate at different speeds.

3 Claims, 4 Drawing Figures

WIRING CONSTRUCTION OF A CONTROL SWITCH CONTROLLING A CEILING FAN

BACKGROUND OF THE INVENTION

The present invention relates to a wiring construction of a control switch controlling a ceiling fan, and more particularly to a wiring construction which arranges the connections between the elements systematically on a printed circuit board.

In the conventional control switch, the connections between the elements are achieved by a plurality of connective wires, and as a result, the connective wires are always becoming entangled with each other. With reference to FIG. 1, there is shown an electrical schematic diagram of a commonly used control switch. The control switch is made up of a reverse switch 40, a condenser 30, and a speed selecting switch 50. The reverse switch 40 is coupled to a power source, for example an A.C. 120 V/60 HZ power source, and to the main winding 21 respectively for changing the polarity of the electrical power supplied to the main winding 21 so as to make the motor reversely rotate. The condenser 30 is connected to one power line 11 and to one end of the auxiliary winding 22 of the drive motor respectively. The speed selecting switch 50 is connected to the other power line 12, the other end of the auxiliary winding 22, and to two tappings of the auxiliary winding 22 respectively for selecting different turns of the auxiliary winding 21 to couple to the power source, so that different speeds of rotation can be selected for the motor. The connections between the above-mentioned elements are achieved by the connective wires 11 to 19. Accordingly, it is highly inconvenient to assemble, inspect, and repair the control switch. Nevertheless, as was known to the inventor, no resolution has been proposed in the past. Therefore, for resolving this problem, the present invention proposes that the connections be arranged systematically on a printed circuit board.

SUMMARY OF THE INVENTION

The primary object of the present invention is to provide an improved wiring construction of a control switch controlling a ceiling fan, which utilizes a printed circuit board to achieve the connections between the elements, so that the wiring is well-regulated. As a result, production procedures are simplified, and the cost is significantly reduced.

The other object of the present invention is to provide a wiring construction of the above character which is firmly secured to a housing of the control switch by a plurality of struts which are capable of being slightly compressed in a radial direction.

In accordance with the present invention, a wire construction of a control switch controlling a ceiling fan, the control switch being manually operated by a cord hanging from the control switch, the wiring construction comprises connecting means having two power source contacts and three connective contacts arranged systematically on a printed circuit board with its three connective contacts connected to a first end and a second end of a first winding of the drive motor driving the ceiling fan, and to a tapping of the winding respectively; a condenser connected to one of the power source contacts, and to the first end of the first winding respectively through the connecting means; and a speed selecting switch actuated by the cord and connected to the second end of the first winding, to the tapping, and to the other power source contact respectively through the connecting means, for selecting different turns of the first winding to couple to the power source, so that the ceiling fan can rotate at different speeds.

BRIEF DESCRIPTION OF THE DRAWINGS

The present invention will be more fully understood from the following detailed description, taken in connection with the accompanying drawings which form an integral part of this application and in which.

DETAILED DESCRIPTION OF THE PREFFERED EMBODIMENT

Figure 1:
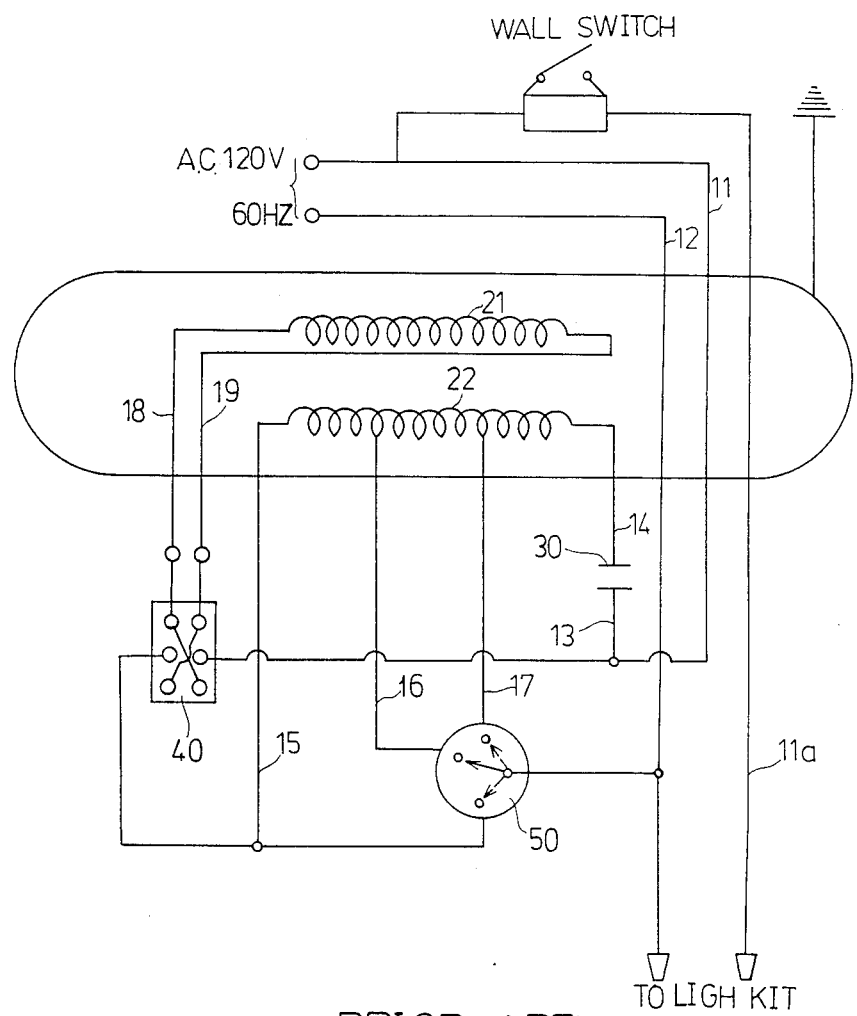
FIG. 1 is an electrical schematic diagram of a conventional control switch for a ceiling fan.
Figure 2:
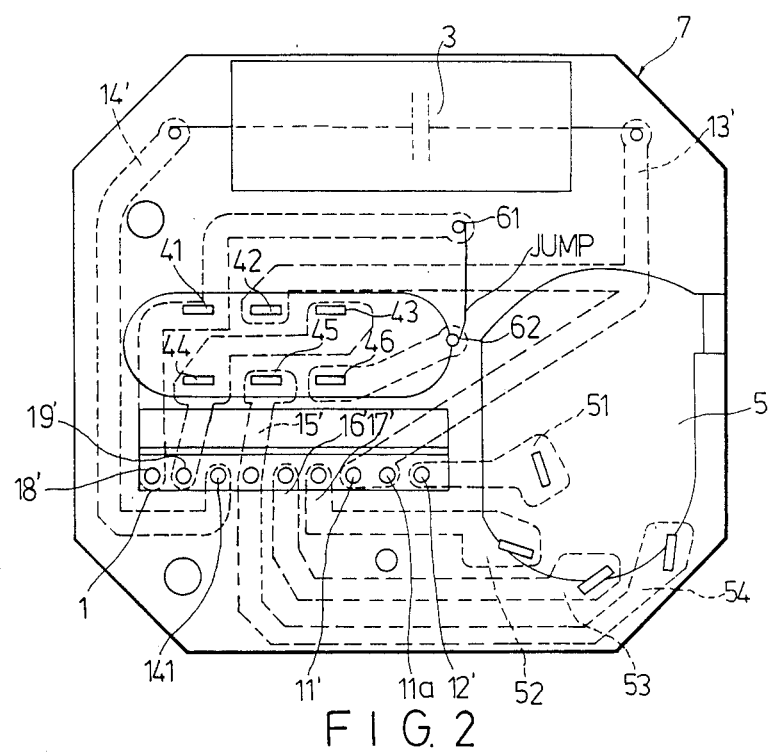
FIG. 2 is a elevational view of connecting means in the form of a printed circuit board in accordance with one preferred embodiment of the present invention.

Referring now to the drawings, it should be noted that a like member is designated with a like reference number. In FIG. 2, there is shown a front elevational view of connecting means 7 in the form of a printed circuit board, wherein the broken lines illustrate the conductive pattern arranged on the rear surface of the connecting means 7. The connecting means 7 includes a connecting seat 1 of the cable pin type having a plurality of connecting holes and being mounted on the lower left hand corner of the printed circuit board 7, as best seen in FIG. 4. The connecting holes 11' & 12' are coupled to the electrical power source. Between the connecting hole 12' and the hole 11a which is conductive to the hole 11, lighting equipment (not shown) may be provided. The hole 11' is connected to connections 13' and 42 respectively. The connection 13' is connected through a starting condenser 3 to a connection 14'. An auxiliary winding (not shown) of the drive motor (not shown) driving the ceiling fan (not shown), like the winding 22 shown in FIG. 1, is connected between the holes 141 and 15'. Two tappings of the auxiliarly winding are connected to the holes 16' and 17' of the connecting seat 1. It should be understood that the number of tappings may also be one or more than two. A main winding (not shown) of the drive motor, like the winding 21 shown in FIG. 1, is connected between the holes 18' and 19'. A speed selecting switch 5 is mounted on the lower right hand corner of the printed circuit board 7 for selecting one of the connections 52, 53, and 54, which are connected to the holes 17', 16', and 15' respectively, to connect electrically to the connection 51 which is connected to the hole 12'. Therefore, the speed selecting switch 5 can select different turns of the auxiliary winding to coupled to the electrical power in order to drive the motor to rotate at different speeds. A reverse switch 4, as best seen in FIGS. 3 and 4, is mounted among the connections 41 to 46 for actuating the motor to rotate reversely in a manner that will be described in detailed herebelow.

When the motor rotates in a clockwise direction, for example, the reverse switch 4 effects the connections between the connections 42 & 43, and the connections 45

& 46 respectively. A current loop is thus formed between the holes 11' & 12' through the connections 42, 43, 44, and 19', the main winding mounted between the holes 19' & 18', the hole 18', the connections 41 & 61, a jump line JUMP connected between the contacts 61 & 62, the contact 62, the connections 46, 45, 15', 54, and 51. Whereas, when one wants the ceiling fan to rotate reversely, the reverse switch 4 can be switched to effect the connections between the connections 41 & 42, and the connections 44 & 45. Thus, a current loop is formed between the holes 11' & 12' through the connections 42, 41, 18', the main winding, the connections 19', 44, 45, 15', 54, and 51, whereby the polarity of electrical power supplied to the main winding is reversed. As a result, the motor is actuated to reversely rotate, i.e. in this example in an anticlockwise direction.

Figure 3:
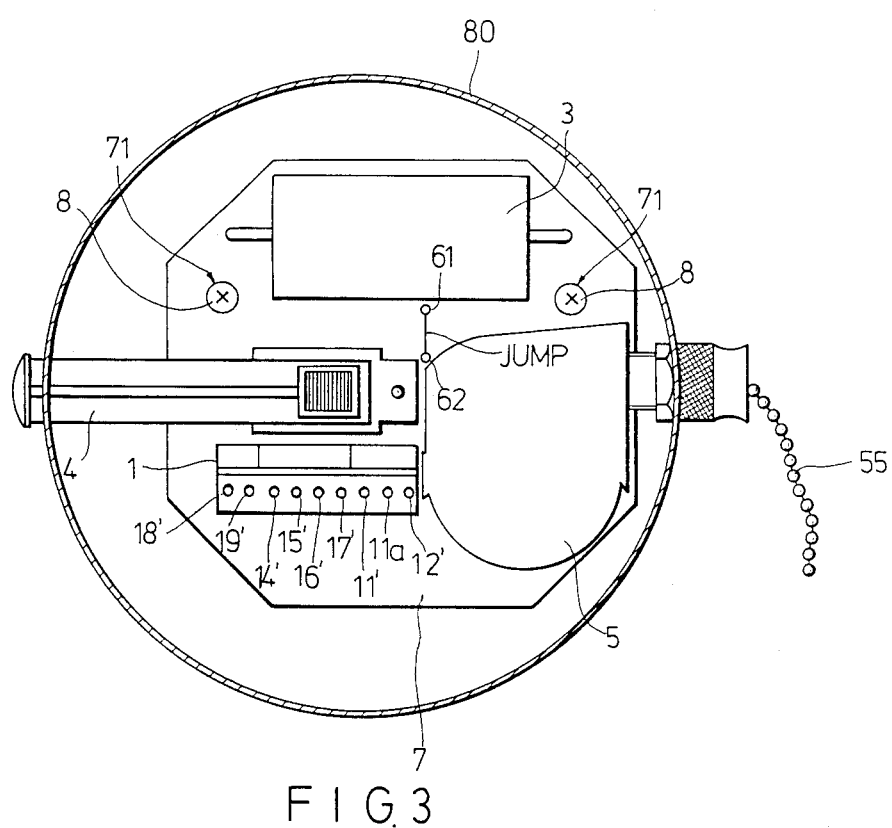
FIG. 3 is an elevational view of the control switch of the present invention with parts of the housing broken away to show the interior.
Figure 4:
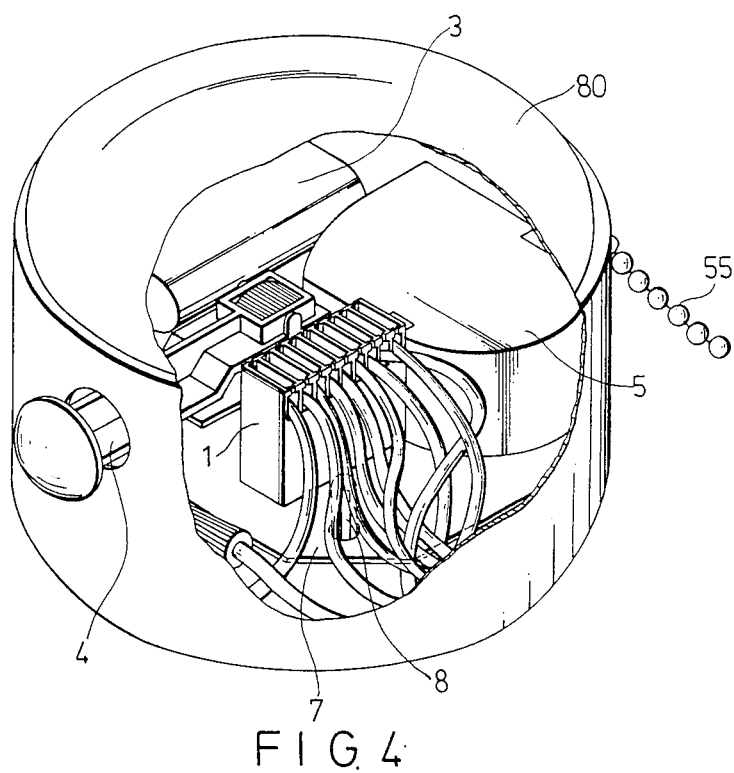
FIG. 4 is a perspective view of the control switch of FIG. 3 with parts of the housing broken away to illustrate the interior.

With reference to FIGS. 3 and 4, the printed circuit board 7, the speed selecting switch 5, and the reverse switch 4 are accommodated within a housing 80. The speed selecting switch 5 is manually operated by a cord 55 hanging from the housing 80 of the control switch. The reverse switch 4 can be pushed and pulled respectively to change the rotational state of the motor. On the printed circuit board 7, a plurality of mounting holes 71 are formed, and on the interior surface of the housing 80, a plurality of corresponding struts 8, which are capable of being slightly compressed in a radial direction, are formed. When assembling the control switch, the printed circuit board 7 is firmly supported on the housing 80 by the struts 8 tightly inserted into the holes respectively.

According to the preferred embodiment described above, the wiring construction of the control switch is significantly simplified, resulting in large decrease in production cost. Also, the control switch can be easily assembled, inspected, and repaired.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims which scope is to be accorded the broadest interpretation so as to encompass all such modifications and equivalent structures.

What is claimed is:

1. A wiring construction of a control switch controlling a ceiling fan, said control switch being manually operated by a cord hanging from said control switch, said wiring construction comprising:

connecting means having two power source contacts and three connective contacts arranged systematically on a printed circuit board with its three connective contacts connected to a first end and a second end of a first winding of the drive motor driving said ceiling fan and to a tapping of the winding respectively;

a condenser connected to one of said power source contacts, and to said first end of said first winding respectively through said connecting means; and a speed selecting switch acutated by said cord, and connected to said second end of the first winding, to said tapping, and to the other power source contact respectively through said connecting means, for selecting different turns of said first winding to couple to the power source, so that the ceiling fan can rotate at different speeds.

2. A wiring construction of a control switch as claimed in claim 1, wherein said connecting means further includes two winding connective contacts, and said wiring construction further comprises a second winding for said drive motor connected across said two winding connective contacts, and a reverse switch coupled to said second winding, and to said power source contacts respectively through said connecting means for changing the polarity of the electrical power supplied to said second winding, so that said motor is actuated to rotate reversely by switching said reverse switch.

3. A wiring construction of a control switch as claimed in claim 2, wherein said printed circuit board of said connecting means has a plurality of mounting holes therethrough, and wherein said control switch includes a housing for accommodating said connecting means, said condenser, said speed selecting switch, and said reverse switch, said housing having a plurality of struts, which are capable of being slightly compressed in radial direction, for inserting tightly into said corresponding mounting holes respectively so as to secure firmly said printed circuit board on said housing.

* * * * *